A. C. BYRUM.
CULTIVATOR.
APPLICATION FILED MAR. 24, 1919.
1,367,536.
Patented Feb. 8, 1921.
5 SHEETS—SHEET 3.
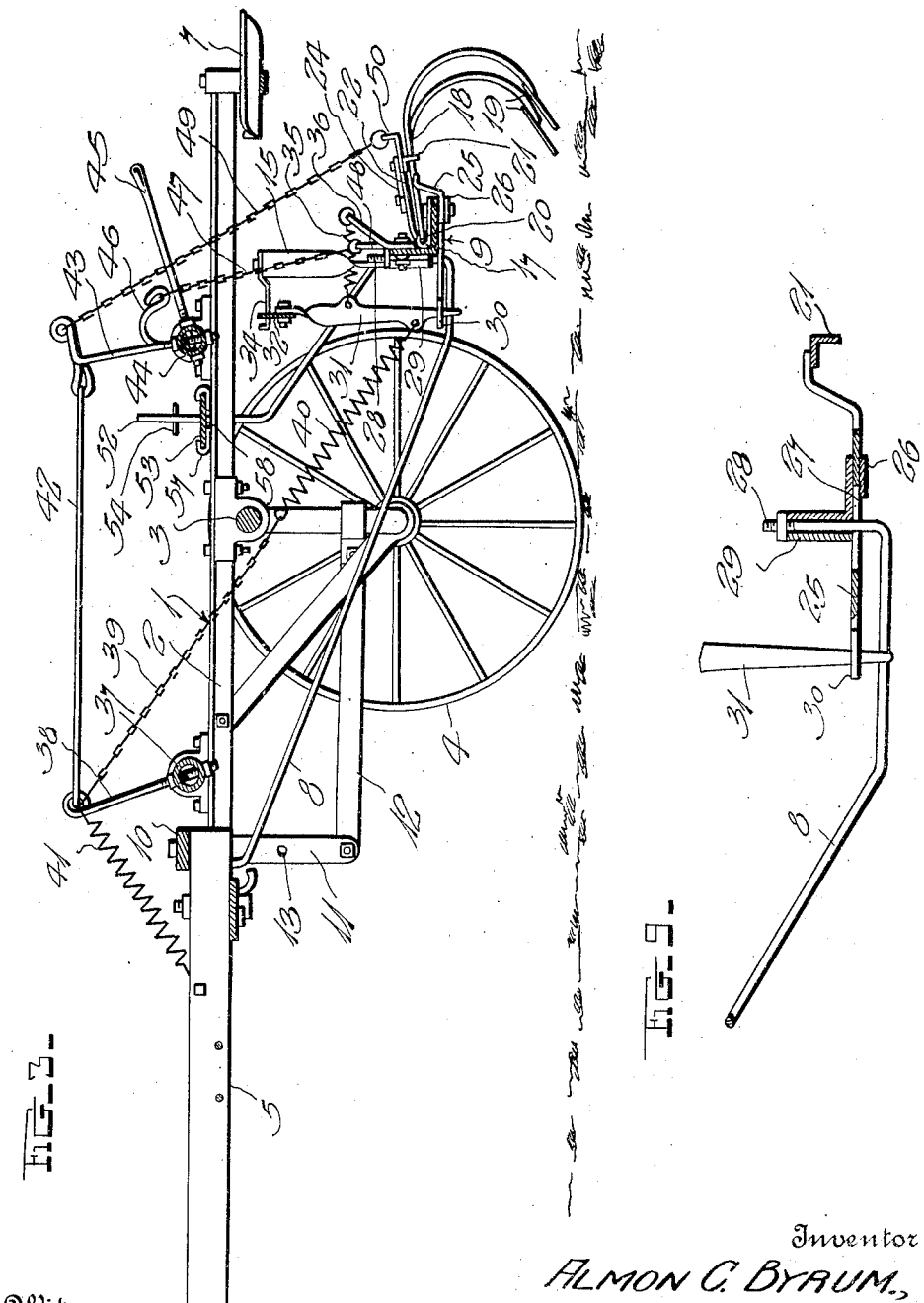
Inventor
ALMON C. BYRUM,
By [signature]
Attorneys
Witness
H. Woodard

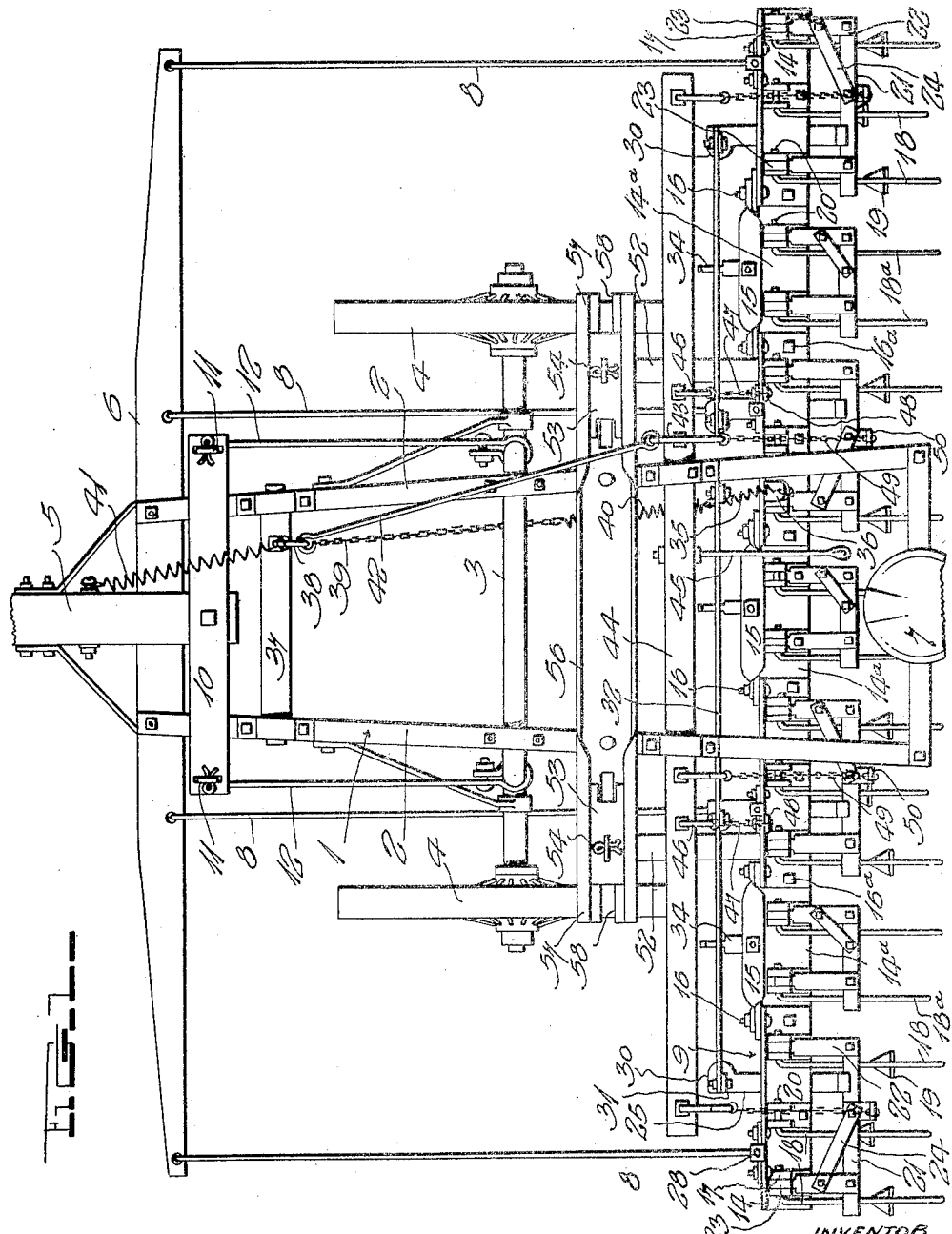

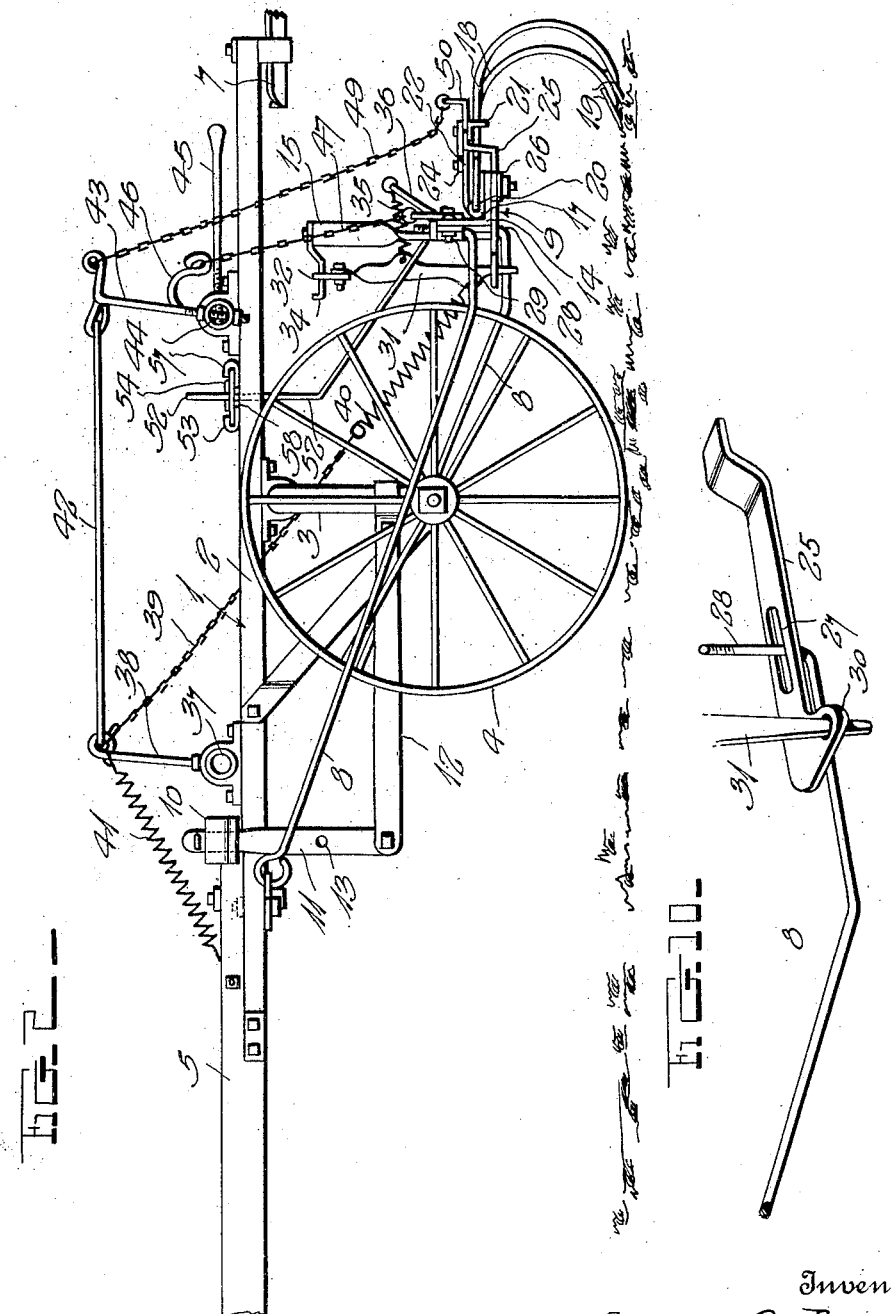

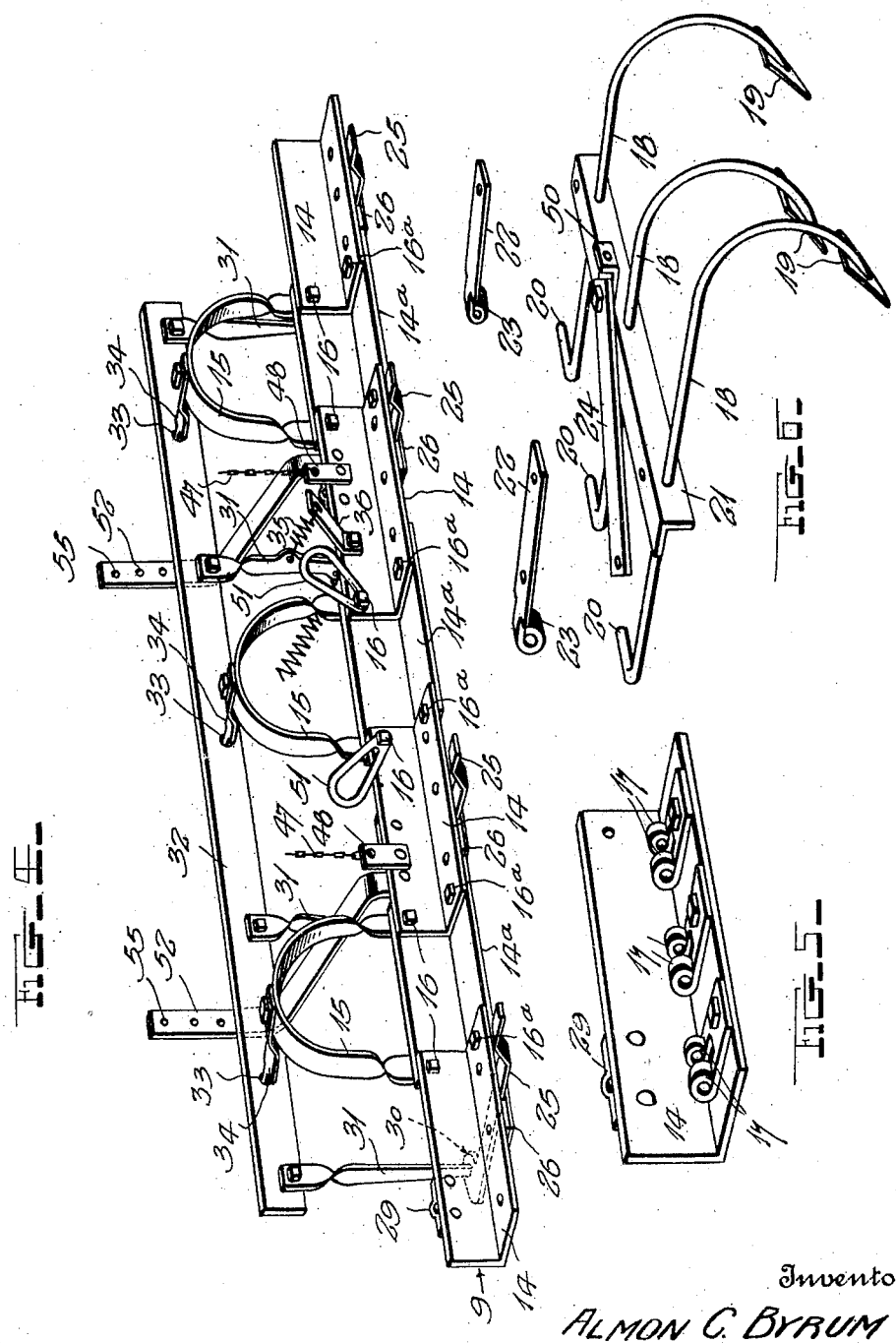

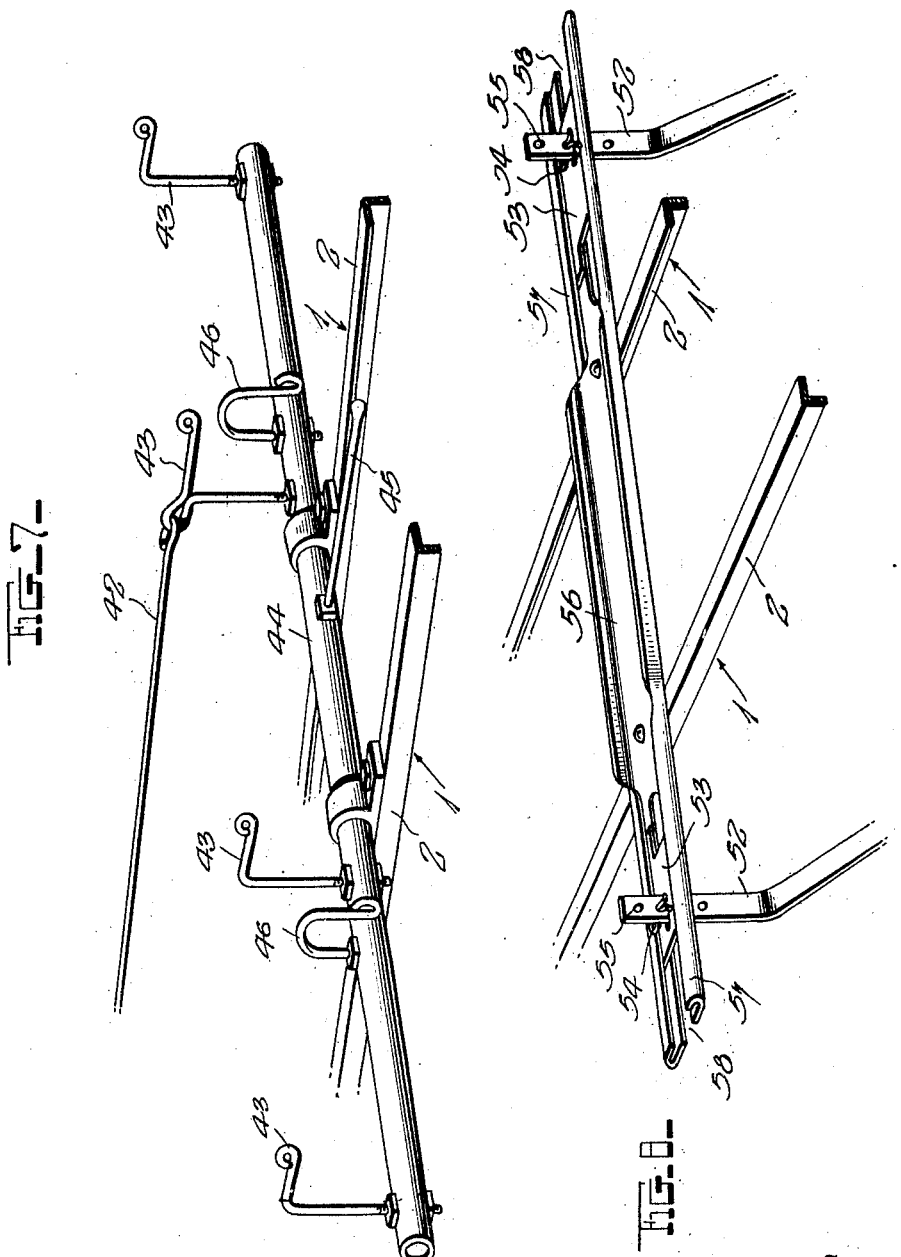

UNITED STATES PATENT OFFICE.

ALMON C. BYRUM, OF ROCKFORD, ILLINOIS.

CULTIVATOR.

1,367,536.      Specification of Letters Patent.      Patented Feb. 8, 1921.

Application filed March 24, 1919. Serial No. 284,556.

*To all whom it may concern:*

Be it known that I, ALMON C. BYRUM, a citizen of the United States, residing at Rockford, in the county of Winnebago and State of Illinois, have invented certain new and useful Improvements in Cultivators; and I do declare the following to be a full, clear, and exact description of the invention, such as will enable others skilled in the art to which it appertains to make and use the same.

My invention relates to straddle row cultivators and one object is to provide a machine of this class having a transverse attaching member for the cultivator beams, formed of spaced bars and arches connecting them to straddle the rows of plants; and in this connection, a further object is to provide supplemental bars to extend between the others for the purpose of carrying additional implements when required.

Another object is the provision of novel latch means for holding the implements in lowered, operative position, and to provide for the release of such latch means and raising of the implements successfully.

A still further object is to provide for raising and lowering the implements without excessive movement of the operating lever provided for this purpose.

Yet another object is to provide a novel arrangement of hangers for the implement attaching member, arranged in such manner as to permit free lateral shifting of said member.

A still further object is to provide efficient means for detachably connecting the implement beams to the machine.

With the foregoing in view, the invention resides in the novel features of construction and unique combinations of parts hereinafter fully described and claimed, reference being made to the accompanying drawings.

Figure 1 is a top plan view of a machine constructed in accordance with my invention.

Fig. 2 is a side elevation.

Fig. 3 is a longitudinal section cut substantially through the center of the machine.

Fig. 4 is a perspective view of the implement attaching member and the associated parts, the attaching knuckles for the cultivator beams being omitted.

Fig. 5 is a perspective view of one section of the implement attaching member.

Fig. 6 is a perspective view of several of the implements and their attaching means.

Fig. 7 is a perspective showing the rock shaft which raises and lowers the implements and actuates the latch means thereof.

Fig. 8 illustrates in perspective the hangers for the implement attaching member, and the mounting of such hangers.

Fig. 9 is a detail longitudinal section of one of the latches and associated parts.

Fig. 10 is a perspective view of certain parts illustrated in Fig. 9.

In the drawings above briefly described, the numeral 1 designates a main portable frame which is here shown as including two side bars 2 suitably secured upon an arched axle 3 having appropriate wheels 4. A suitable tongue 5 and a transverse bar 6 are secured to the front end of the frame 1 and a driver's seat 7 is appropriately mounted at the rear end thereof, said bar 6 extending a considerable distance beyond the wheels 4 and serving as attaching means for the end of draw rods 8 which are connected at their rear ends to an implement attaching member 9 to be described in detail. The front end of the frame 1 may also carry an equalizing lever 10 from which vertical levers 11 depend to longitudinal links 12 whose rear ends are attached to the axle 3, said vertical levers having openings or the like 13 for attaching any preferred draft appliances to the machine.

The implement attaching member 9 is illustrated in detail in Figs. 4 and 5, said member consisting of spaced bars 14 alined transversely of the machine and connected at their adjacent ends by rigid arches 15, the ends of the arches being secured to the bar ends by bolts or other preferred means 16. Each of the bars 14 is by preference formed of angle iron and as clearly shown in Fig. 5, is provided with several pairs of spaced knuckles 17. The beams 18 of the cultivator shovels 19 or other implements which may be employed, are provided on their front ends with laterally extending studs 20 received in the knuckles 17, said studs being preferably formed by bending the beams as shown in Fig. 6. For each series of the beams 18, a spacing bar 21 is provided, and arms 22 are bolted or otherwise secured to said spacing bars and extend forwardly therefrom, the front ends of said arms having knuckles 23 received between certain of the knuckles 17 to receive the studs 20. One or more of the arms 22 of each series of implements is braced by a suitable brace bar 24 bolted or otherwise secured to the arm and to the spacing bar 21. By the provision of one or more brace bars, pivotal movement of the arms 22 with respect to the spacing bars 21 is prevented, and since the knuckles 23 of said arms are snugly received between the knuckles 17, lateral movement of the implements is prevented. When removal of the beams is required, the bars 24 are released and the arms 22 detached, thus allowing lateral movement of said beams to withdraw their studs 20 from the knuckles 17.

In some instances, it is desirable to provide additional beams 18ª between the series of beams 18, the former preferably having no shovels such as 19. To permit the attachment of these additional implements, supplemental implement attaching bars 14ª may extend between the ends of the spaced bars 14, being secured thereto by the bolts 16 and by other bolts 16ª if required. Implements 18ª are connected to the bars 14ª in the same manner as the beams 18 are mounted on the bars 14, description being therefore unnecessary.

For holding the implements 18 in lowered, operative position, a plurality of longitudinally slidable latches 25 are mounted in suitable guides 26 carried by the bars 14 as shown clearly in Figs. 2, 3, 9 and 10, the rear ends of said latches being projectable over the spacing bars 21 as shown. Each latch 25 is preferably provided with a longitudinal slot 27 and these slots receive the upwardly turned rear ends 28 of the draw rods 8, said ends being pivotally mounted in suitable bearings 29 secured to the bars 14. The front ends of the latches 25 are provided with eyes 30 receiving the lower ends of vertical arms 31 which depend from a transverse bar 32. The bar 32 may be mounted in any preferred manner but is shown provided with openings 33 receiving fingers 34 which extend forwardly from the arches 15. At least one spring 35, connected at one end to one of the arms 31 and at its other end to the member 9, by means of a suitable bracket or the like 36, is provided for sliding the bar 32 and the several arms 31 rearwardly, so that the latches 25 are held in operative position over the spacing bars 21. When the bar 32 and its arms are pulled forwardly, however, all of the latches are simultaneously released, and I have made novel provision for first releasing these latches and then raising the implements, as described below.

A rock shaft 37 is mounted transversely at the front end of the frame 1 and is provided with an upstanding crank arm 38 which is connected by means of a chain 39 and a coil spring 40 to one end of the arms 31. A spring 41 exerts a forward pull on the crank arm 38 to assist in the manual release of the latches and raising of the implements, and a rod 42 leads rearwardly from said crank arm to one of a series of comparatively long crank arms 43 on a second and longer rock shaft 44 at the rear end of the machine, this shaft being provided with an operating lever or handle 45 adjacent the driver's seat 7. Relatively short crank arms 46 are also secured to the shaft 44, chains or the like 47 depend from these arms to the member 9 and are connected therewith by suitable links 48, and other chains 49 depend from the arms 43 to the spacing bars 21, to which they are connected by appropriate brackets 50.

By the arrangement of parts just described, when the lever 45 is moved upwardly and forwardly, the rod 42 operates the rock shaft 37 and pulls upon the connector 39—40, thus pulling the arms 31 and bar 32 forwardly to release all of the latches 25. After such release has taken place, the chains 47 and 49 which were previously slack, come into play to raise the attaching member 9 and the implements bodily, at the same time swinging said implements upwardly upon their pivotal mountings formed by the knuckles 17 and studs 20. By bodily lifting the member 9 and the implements and at the same time swinging said implements upwardly upon their pivots, by means of the relatively long crank arms 43, only a slight movement on the part of the rock shaft 44 is necessary to raise the implements entirely clear of the ground and a sufficient distance from the latter to prevent striking rocks and other obstructions. It will be observed that since the several latches 25 are released prior to raising of the implements, further movement of the parts 44, 42, 38 and 37 is necessary to effect such raising, and it is to allow such movement that the spring 40 is provided, although it will of course be understood that any other appropriate elastic connection could be employed for the same purpose.

The attaching member 9 of the implements is provided with stirrups 51 so that the operator may guide the implements with his feet in the usual manner, and to allow lateral shifting of the implements and their carrying member 9, a novel arrangement of hangers is provided for the latter. Two or more hanger bars 52 are rigidly secured to and raise from the member 9, preferably extending forwardly and upwardly as shown, the upper ends of said hanger bars passing through slots in slide plates 53 which are mounted on appropriate track means for sliding transversely of the frame 1. Cotter-pins 54, receivable in opening 55 in the bars 52, prevent downward sliding of said bars beyond a predetermined extent and by adjusting said pins to other openings, the extent of lowering of the attaching member 9 may be varied.

The track means for the slides 53 may be of any adequate construction to permit free movement of said slides as the attaching member and its implements are shifted from side to side, but I prefer to provide a channel iron bar 56 secured to the frame 1 with the end portions of its side flanges bent inwardly at 57 and with its bottom provided with slots 58. The slides 53 rest on the bottom of the channel and are received beneath the bent flanged ends 57 and the bars 52 rise through the slots 58. This is a simple and inexpensive yet an adequate construction for supporting the slides.

The operation of the machine will probably be clear to those skilled in the art, but it may be again set forth that the implements are effectively held in operative position by the latches 25; these latches are released prior to raising of the implements, this operation all taking place from the single handle 45; by the arrangement of long and short crank arms 43 and 46 on the shaft 44, adequate raising of the implements is accomplished without excessive rotation of said shaft; the hanger bars 52 and associated parts limit the downward movement of the supporting member 9 while allowing free shifting thereof transversely of the machine and free raising, since said bars slide through the members 53; the bars 14ª and other implements 18ª may be attached and detached at will; and all the implements may be readily removed from their carrying means whenever required.

Since probably the best results are obtained from the details disclosed, they may well be followed, but within the scope of the invention as claimed, numerous minor changes may well be made.

I claim:

1. In a machine of the class described, a portable frame having a transverse bar at its front end, a plurality of draw rods extending rearwardly from said transverse bar, spaced bars alined transversely of the machine and carried one by each draw rod, transverse arches secured at their ends to the ends of said bars, and implements connected to said bars.

2. In a machine of the class described, a portable frame, a plurality of spaced bars alined transversely of the machine and carrying implements, draft means connecting said bars to said frame, and supplemental, implement carrying bars adapted to extend between and to be secured to said first named bars.

3. In a machine of the class described, a portable frame, a plurality of spaced, implement carrying bars alined transversely of the machine, draft means connecting said bars to said frame, transverse arches secured at their ends to the ends of said bars, and supplemental, implement carrying bars adapted to extend between and to be secured to said first named bars.

4. In a machine of the class described, a portable frame having a vertically movable implement, a latch for holding said implement in lowered position for use, a control member, means connecting said control member and said latch for releasing the latter when the former is moved a predetermined amount, and means actuated by further movement of said control member for lifting the implement.

5. In a machine of the class described, a portable frame having a vertically movable implement, means for holding said implement in lowered, operative position, a rock shaft on said frame and means connecting it with said holding means for releasing the latter, means including a second rock shaft on the frame for raising said implement, a handle for turning one of said rock shafts, and means connecting the two rock shafts for movement in unison, provision being made for releasing said holding means prior to operation of said raising means.

6. In a machine of the class described, a portable frame having a vertically movable implement, means for holding said implement in lowered, operative position, a rock shaft on said frame having an operating handle, means connecting said rock shaft and implement for raising the latter, a second rock shaft on the frame, means connecting the two shafts for movement in unison, and elastic connecting means between said second rock shaft and said holding means for first releasing the latter and then allowing further rotation of the rock shafts to raise the implement.

7. In a machine of the class described, a portable frame having a vertically movable implement, a latch for holding said implement in lowered position, means for raising said implement, said implement raising means having lost motion before acting on said implement, and operating connections between said implement raising means and said latch for releasing the latter while the aforesaid lost motion takes place, said operating connections having an elastic portion for permitting further movement of said implement raising means after release of said latch.

8. In a machine of the class described, a portable frame having transversely spaced implements mounted for upward swinging, latches for holding said implements in lowered operative position, a transverse bar above the latches having depending arms connected with the latter, and means for moving said bar to release said latches.

9. In a machine of the class described, a portable frame having transversely spaced implements, latches for holding said implements in lowered, operative position, a transverse bar above said latches having openings, fingers fixedly carried by the frame and received loosely in said openings, arms depending from said bar and connected to said latches, and means for sliding said bar on said fingers to shift said arms and release the latches.

10. In a machine of the class described, a portable frame, a transverse implement attaching member carried by said frame and including transverse arches vertically swinging implements connected to said attaching member, latches mounted on said attaching member for holding said implements in lowered, operative position, fingers projecting from said arches, a transverse bar having openings loosely receiving said fingers, arms depending from said bar and connected with said latches, and means for sliding said bar on said fingers to shift said arms and release said latches.

11. In a machine of the class described, a portable frame, a plurality of implements pivoted to said frame for vertical swinging, a transverse bar connecting said implements, a latch mounted for projection over said bar to retain the implements in lowered, operative position, and means for releasing said latch.

12. In a machine of the class described, a portable frame, a vertically movable implement-attaching member connected with said frame for movement therewith, an implement pivoted to said attaching member, and means mounted on said frame for bodily raising said attaching member and implement and for simultaneously swinging said implement upwardly on its pivot.

13. In a machine of the class described, a portable frame, a vertically movable implement-attaching member connected with said frame for movement therewith, an implement pivoted to said attaching member, a rock shaft mounted on said frame, independent chains connected respectively to said connecting member and implement, and crank means connecting said chains to said rock shaft, with the chain of the implement connected farther from the center of the shaft than the other chain, whereby the implement will be upwardly swung and simultaneously raised bodily with said attaching member when the shaft is rocked.

14. In a machine of the class described, a portable frame, a vertically movable implement-attaching member connected with said frame for movement therewith, an implement pivoted to said attaching member, a rock shaft mounted on said frame and having a handle, relatively long and short crank arms on said rock shaft, a chain depending from said short crank arm to said attaching member, and an additional chain depending from the long crank to said implement.

15. In a machine of the class described, a portable frame provided with transverse track means, slides movable along said track means, hangers depending from said slides, a transverse implement carrying member connected to the lower ends of said hangers, and draft means for said implement carrying member.

16. In a machine of the class described, a portable frame provided with transverse track means, slides movable along said track means, hangers depending from said slides and connected therewith for upward sliding therethrough, a transverse implement carrying member connected to the lower ends of said hangers, draft means for said implement carrying member, and means for raising said member, said hangers sliding through said slides upon the raising operation.

17. In a machine of the class described, a portable frame having a transverse channel iron bar whose flanges are bent inwardly along their end portions, the bottom of said bar having slots between said bent flange ends, slides resting on said bottom and received under said bent flange ends, hangers depending from said slides through said slots, a transverse implement carrying member connected to the lower ends of said hangers, and draft means for said implement carrying member.

18. In a machine of the class described, a portable frame having a transverse implement attaching bar provided with pairs of spaced knuckles, an implement beam for each pair of knuckles having a lateral stud received therein, a transverse spacing bar mounted on said beams, an arm extending forwardly from said spacing bar and having a knuckle received between the knuckles of one of said pairs, and means for preventing pivotal movement of said arm with respect to said spacing bar, whereby lateral shifting of said beams to withdraw their studs from the knuckles is prevented.

In testimony whereof I have hereunto set my hand.

ALMON C. BYRUM.